US010825093B2

(12) United States Patent
Vicari et al.

(10) Patent No.: US 10,825,093 B2
(45) Date of Patent: Nov. 3, 2020

(54) MAPPING CONSUMER OWNERSHIP OF FINANCIAL ASSETS TO GEOGRAPHIC LOCALITIES AND COMPUTER-IMPLEMENTED METHODS AND COMPUTER SYSTEMS THEREOF

(71) Applicant: Broadridge Financial Solutions, Inc., Jersey City, NJ (US)

(72) Inventors: Joseph Vicari, Edgewood, NY (US); Niten Jaiswal, Edgewood, NY (US); Steven Krzemienski, Edgewood, NY (US)

(73) Assignee: Broadridge Financial Solutions, Inc., Jersey City, NJ (US)

( * ) Notice: Subject to any disclaimer, the term of this patent is extended or adjusted under 35 U.S.C. 154(b) by 243 days.

(21) Appl. No.: 15/872,794

(22) Filed: Jan. 16, 2018

(65) Prior Publication Data
US 2018/0211321 A1   Jul. 26, 2018

Related U.S. Application Data

(63) Continuation of application No. 14/216,901, filed on Mar. 17, 2014, now abandoned.
(Continued)

(51) Int. Cl.
*G06Q 40/06*     (2012.01)
(52) U.S. Cl.
CPC .................................. *G06Q 40/06* (2013.01)
(58) Field of Classification Search
CPC ........ G06Q 40/06; G06Q 40/04; G06Q 40/00; G06Q 40/08; G06Q 40/02
(Continued)

(56) References Cited

U.S. PATENT DOCUMENTS

| 2002/0120519 A1* | 8/2002 | Martin | G06Q 40/04 705/21 |
| 2005/0199722 A1* | 9/2005 | Borja | G06K 9/726 235/462.01 |

(Continued)

OTHER PUBLICATIONS

Hargreaves, James R et al. "Assessing household wealth in health studies in developing countries: a comparison of participatory wealth ranking and survey techniques from rural South Africa." Emerging themes in merging themes in epidemiology vol. 4 4. Jun. 1, 2007 (Year: 2007).*

*Primary Examiner* — Mike Anderson
*Assistant Examiner* — Bolko M Hamerski
(74) *Attorney, Agent, or Firm* — Greenberg Traurig, LLP

(57) ABSTRACT

In some embodiments, the instant invention provides a programmed system that includes at least the following components: a computer programmed with software instructions that include: code to periodically receive financial data of a plurality of customers from a plurality of financial-related entities related to a plurality of financial assets, code to consolidate the financial data into a consolidated financial data; code to analyze the consolidated financial data with at least one address-matching program; code to associate each record of the consolidated financial data with a respective eleven digit postal code to result in an address-enriched consolidated financial data; code to anonymize the address-enriched consolidated financial data to form an anonymous address-enriched consolidated financial data; and code to link information of the anonymous address-enriched consolidated financial data across a plurality data relationship to form a consolidate household view for each respective eleven digit postal code.

16 Claims, 6 Drawing Sheets

Related U.S. Application Data

(60) Provisional application No. 61/801,059, filed on Mar. 15, 2013.

(58) Field of Classification Search
USPC .................................................. 705/36 R
See application file for complete search history.

(56) References Cited

U.S. PATENT DOCUMENTS

| | | | | |
|---|---|---|---|---|
| 2006/0106703 A1* | 5/2006 | Del Rey | ............... | G06Q 40/06 705/35 |
| 2009/0055206 A1* | 2/2009 | Orbke | .................. | G06Q 10/08 705/1.1 |
| 2011/0205231 A1* | 8/2011 | Hartley | ................. | G06Q 40/00 345/440 |
| 2011/0208562 A1* | 8/2011 | Hartley | ............. | G06Q 30/0204 705/7.33 |
| 2011/0298805 A1* | 12/2011 | Laurito | ................. | G06Q 40/06 345/440 |

\* cited by examiner

MAPPING CONSUMER OWNERSHIP OF FINANCIAL ASSETS TO GEOGRAPHIC LOCALITIES AND COMPUTER-IMPLEMENTED METHODS AND COMPUTER SYSTEMS THEREOF

RELATED APPLICATIONS

This application claims the priority of U.S. provisional application Ser. No. 61/801,059, filed Mar. 15, 2013, entitled "COMPUTER-IMPLEMENTED METHODS AND COMPUTER SYSTEMS FOR ANALYZING CONSUMER OWNERSHIP OF FINANCIAL ASSETS," which is incorporated herein by reference in its entirety for all purposes.

TECHNICAL FIELD

In some embodiments, the present invention relates to determining consumer ownership of financial assets per geographic locality(ies) and computer-implemented methods and computer systems utilized for the determination and application thereof.

BACKGROUND

Per the 2012 Investment Company Fact Book by the Investment Company Institute (52 edition) ("2012 Investment Book"), U.S. households are the largest group of investors in funds, and registered investment companies managed 23 percent of households' financial assets at year-end 2011. For example, per the 2012 Investment Book, number of households owning mutual funds was 52.3 million, number of individuals owning mutual funds was 90.4 million, percentage of households owning mutual funds was 44%, median mutual fund assets of fund-owning households was $120,000, and median number of mutual funds owned was 4. For example, per the 2012 Investment Book, households invested an average of $409 billion each year, on net, in registered investment companies versus average annual sales, on net, of $377 billion in directly held stocks and bonds over similar period. For example, per the 2012 Investment Book, there had been significant growth of individual retirement accounts (IRAs), defined contribution (DC) plans, particularly 401(k) plans. For example, per the 2012 Investment Book, at year-end 2011, 9 percent of household financial assets was invested in 401(k) and other DC retirement plans. For example, per the 2012 Investment Book, IRAs made up 10 percent of household financial assets. For example, per the 2012 Investment Book, mutual funds managed $982 billion in variable annuities outside of retirement accounts, as well as $4 trillion of assets in taxable household accounts.

BRIEF SUMMARY OF INVENTION

In some embodiments, the instant invention provides a specifically programmed system that includes at least the following components: at least one programmed computer, having a non-transient computer tangible readable medium having stored thereon software instructions executable by at least one processor of the computer, where the software instructions at least include: code to periodically receive financial data from a plurality of financial-related entities related to a plurality of financial assets, where the receipt of the financial data during a particular time period results in an amount of the financial data that requires to split the financial data into a plurality of subparts to process the subparts of the financial data in parallel, hereby allowing to process the financial data received at the particular time period before a receipt of new financial data during a subsequent time period, where the financial data comprises a plurality of the following data: i) financial assets data, where the financial assets data comprises at least the following data for each financial asset: 1) a unique identifier that uniquely identifies such financial asset in a financial industry, 2) a record date of such financial asset, where the record date is a date on which owners of such financial asset to be identified, 3) an issuer name of such financial asset, and 4) a value or an amount of such financial asset that has been publicly distributed, ii) customer financial data, where the customer financial data comprises at least one of the following data: customer account data of a plurality of customers of the plurality of financial-related entities, customer prospectus data of the plurality of customers of the plurality of financial-related entities, and customer trade confirmation data of the plurality of customers of the plurality of financial-related entities, and iii) financial asset ownership data from issuers of the plurality of financial assets; code to consolidate the financial data from the plurality of financial-related entities into a consolidated financial data stored in at least one database file based on at least one standardized data format; code to analyze each record of the consolidated financial data with at least one address-matching program; based on the analysis with the at least one address-matching program, code to associate each record of the consolidated financial data with a respective eleven digit postal code to result in an address-enriched consolidated financial data; code to receive credit demographic data and lifestyle data for each for at least the plurality of customers of the plurality of financial-related entities; code to split the address-enriched consolidated financial data into a plurality of subparts, allowing the specifically programmed processing computer system to process the plurality of subparts of the address-enriched consolidated financial data in parallel; code to aggregate the credit demographic data and the lifestyle data with the address-enriched consolidated financial data for at least a portion of the plurality of customers of the plurality of financial-related entities; after the aggregation, code to anonymize the address-enriched consolidated financial data to form an anonymous address-enriched consolidated financial data; and code to link information of the anonymous address-enriched consolidated financial data across a plurality data relationship to form a consolidate household view of the anonymous address-enriched consolidated financial data for each respective eleven digit postal code.

In some embodiments, the code further includes at least: code to map ownership of each of the plurality of financial assets to at least one geographic location based on the consolidate household view of the anonymous address-enriched consolidated financial data for each respective eleven digit postal code.

In some embodiments, the code to consolidate the financial data from the plurality of financial-related entities into the consolidated financial data further includes at least code to remove duplicate information. In some embodiments, the unique identifier of an financial asset is CUSIP, and the code further includes at least code to calculate a total number of shares held per each respective eleven digit postal code. In some embodiments, the unique identifier of an financial asset is CUSIP, and the code further includes at least, for each financial-related entity, code to calculate a total number of shares held per each respective eleven digit postal code.

In some embodiments, the customer financial data comprises at least one of: i) a current customer financial data, and ii) a historical customer financial data. In some embodiments, at least a first portion of customers of the plurality of customers of the plurality of financial-related entities are individuals. In some embodiments, at least a second portion of customers of the plurality of customers of the plurality of financial-related entities are corporate entities.

In some embodiments, the instant invention provides a computer-implemented method that includes at least steps of: periodically receiving, by a specifically programmed processing computer system, financial data from a plurality of financial-related entities related to a plurality of financial assets, where the receiving the financial data during a particular time period results in an amount of the financial data that requires to split the financial data into a plurality of subparts to process the subparts of the financial data in parallel, hereby allowing to process the financial data received at the particular time period before a receipt of new financial data during a subsequent time period, where the financial data comprises a plurality of the following data: i) financial assets data, where the financial assets data comprises at least the following data for each financial asset: 1) a unique identifier that uniquely identifies such financial asset in a financial industry, 2) a record date of such financial asset, where the record date is a date on which owners of such financial asset to be identified, 3) an issuer name of such financial asset, and 4) a value or an amount of such financial asset that has been publicly distributed, ii) customer financial data, where the customer financial data comprises at least one of the following data: customer account data of a plurality of customers of the plurality of financial-related entities, customer prospectus data of the plurality of customers of the plurality of financial-related entities, and customer trade confirmation data of the plurality of customers of the plurality of financial-related entities, and iii) financial asset ownership data from issuers of the plurality of financial assets; consolidating, by the specifically programmed processing computer system, the financial data from the plurality of financial-related entities into a consolidated financial data stored in at least one database file based on at least one standardized data format; analyzing, by the specifically programmed processing computer system, each record of the consolidated financial data with at least one address-matching program; based on the analyzing with the at least one address-matching program, associating, by the specifically programmed processing computer system, each record of the consolidated financial data with a respective eleven digit postal code to result in an address-enriched consolidated financial data; receiving, by the specifically programmed processing computer system, credit demographic data and lifestyle data for each for at least the plurality of customers of the plurality of financial-related entities; splitting, by the specifically programmed processing computer system, the address-enriched consolidated financial data into a plurality of subparts, allowing the specifically programmed processing computer system to process the plurality of subparts of the address-enriched consolidated financial data in parallel; aggregating, by the specifically programmed processing computer system, the credit demographic data and the lifestyle data with the address-enriched consolidated financial data for at least a portion of the plurality of customers of the plurality of financial-related entities; after the aggregating, anonymizing, by the specifically programmed processing computer system, the address-enriched consolidated financial data to form an anonymous address-enriched consolidated financial data; and linking, by the specifically programmed processing computer system, information of the anonymous address-enriched consolidated financial data across a plurality data relationship to form a consolidate household view of the anonymous address-enriched consolidated financial data for each respective eleven digit postal code.

BRIEF DESCRIPTION OF THE DRAWINGS

The present invention will be further explained with reference to the attached figures. The figures constitute a part of this specification and include illustrative embodiments of the present invention and illustrate various objects and features thereof. Specific functional details disclosed herein are not to be interpreted as limiting, but merely as a representative basis for teaching one skilled in the art to variously employ the present invention.

Figure 1:
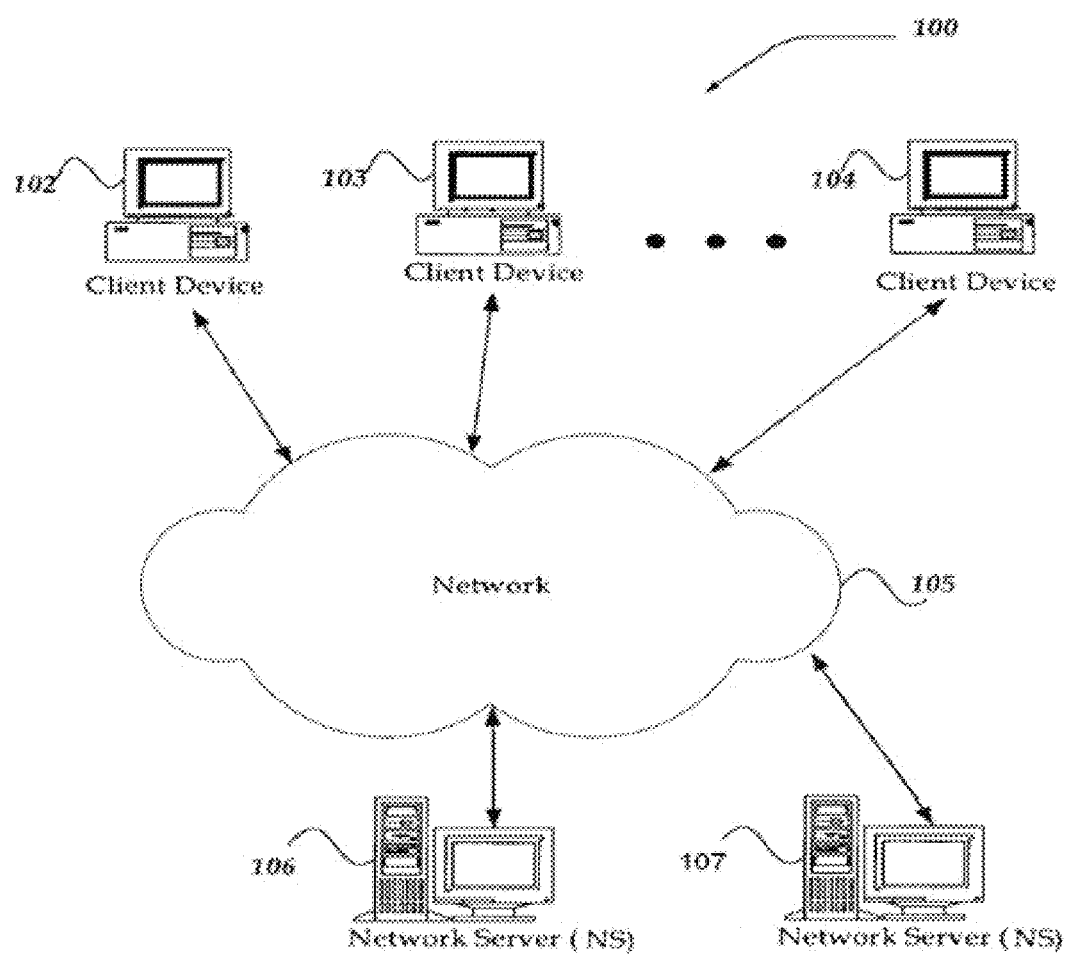
FIGS. 1-2 illustrate schematics of exemplary computer systems in accordance with some embodiments of the invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive. Any alterations and further modifications of the inventive feature illustrated herein, and any additional applications of the principles of the invention as illustrated herein, which can normally occur to one skilled in the relevant art and having possession of this disclosure, are to be considered within the scope of the invention.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For purposes of this description, in some embodiments, the term "record date" is directed to a date on which books of a issuer of a financial asset are closed during the process of identifying the owners for purposes of transmitting dividends, interest, proxies, financial reports, and other similar documentation to them. For example, only the common stockholders who are listed on the record date will receive the dividends that are to be mailed on the payment date.

In some embodiments, the instant invention is directed to computer methods and computer systems to geographical analysis of financial instrument distributions across the United States and/or in international jurisdictions (e.g., household, a single physical address, a street, an area, a town, a city, a state, a country, a continent, etc.). In some embodiments, the instant invention generates data that summarizes the financial instruments household have acquired in a particular geographic region.

In some embodiments, the instant invention at least includes receiving/obtaining an input data that includes, for example, CUSIPs (a 9-character alphanumeric code which identifies a North American financial security), record date, and other suitable data describing certain financial asset (a stock, mutual fund, corporate paper, etc). In some embodiments, if no time is specified, the inventive systems utilizes a current time by default. Based at least in part on input data that includes at least CUSIPs or similar suitable information that identifies the financial assets, in some embodiments, the inventive computer systems of the instant invention would communicate with other computer systems of, for example, financial institutions (e.g., exchanges, banks, brokerages, issuers, mutual fund manufacturers, etc.) to request/obtain/receive asset information from various source systems.

In some embodiments, the instant invention at least includes a record consolidation step that can include taking individual files from numerous source systems, normalizing information into a singular standard format for enrichment, and a removal of the duplicate information.

In some embodiments, the received data from the financial-related entities can include records related to ownership of financial assets by at least 50 of individual and/or entities (e.g., who are customers of financial-related entities such as banks, brokerages, etc.). In some embodiments, the received data from the financial-related entities can include records related to ownership of financial assets by at least 100 of individual and/or entities (e.g., who are customers of financial-related entities such as banks, brokerages, etc.). In some embodiments, the received data from the financial-related entities can include records related to ownership of financial assets by at least 1,000 of individual and/or entities (e.g., who are customers of financial-related entities such as banks, brokerages, etc.). In some embodiments, the received data from the financial-related entities can include records related to ownership of financial assets by at least 10,000 of individual and/or entities (e.g., who are customers of financial-related entities such as banks, brokerages, etc.). In some embodiments, the received data from the financial-related entities can include records related to ownership of financial assets by at least 100,000 of individual and/or entities (e.g., who are customers of financial-related entities such as banks, brokerages, etc.). In some embodiments, the received data from the financial-related entities can include records related to ownership of financial assets by at least 1,000,000 of individual and/or entities (e.g., who are customers of financial-related entities such as banks, brokerages, etc.).

In some embodiments, the instant invention at least includes a step of address enrichment that include at least processing each record within file(s) and based at least in part on address information add CASS-certified postal 11-digit ZIP code (Delivery Point Code) to each record that identifies an ownership of at least one financial asset by at least one individual and/or a group of related individuals. For example, typically, a ZIP+4 code uses the basic five-digit code plus four additional digits to identify a geographic segment within the five-digit delivery area, such as a city block, a group of apartments, an individual high-volume receiver of mail or any other unit that could use an extra identifier to aid in efficient mail sorting and delivery. In general, mail is read by a multiline optical character reader (MLOCR) that almost instantly determines the correct ZIP+4 code from the address and—along with the even more specific delivery point—sprays a Postnet bar code on the face of the mail piece that corresponds to 11 digits—nine for the ZIP+4 code and two for the delivery point. For example, for Post Office Boxes, the general (but not invariable) rule is that each box has its own ZIP+4 code. The add-on code is often one of the following: the last four digits of the box number (e.g., PO Box 727050, Defreestville N.Y. 12144-7050), zero plus the last three digits of the box number (e.g., PO Box 17727, Eagle River, Ark. 99577-0727), or, if the box number consists of fewer than four digits, enough zeros are attached to the front of the box number to produce a four-digit number (e.g., PO Box 77, Juneau Ark. 99750-0077). At least in some cases, there is no uniform rule, so the ZIP+4 code must be looked up individually for each box.

The CASS certification is performed by the U.S. Postal service. Typically, CASS is offered to all mailers, service bureaus, and software vendors who want to evaluate their address-matching software and improve the quality of their ZIP+4, CRIS, and 5-digit coding accuracy. Typically, this process is graded by the United States Postal Service®, National Customer Support Center (NCSC), and the results returned to mailers in order to provide useful diagnostics for correcting deficiencies, https://www.usps.com/business/certification-programs.htm.

In some embodiments, to improved speed/performance the processing, the inventive systems of the instant invention analyze and split the received data (e.g., file(s)) optimally into subparts for parallel processing before a new batch of data is received.

In some embodiments, after the ZIPs are assigned, the anonymous data is linked across multiple relationships to form consolidated household view, for example, based at least in part on geographic location. In some embodiments, the instant invention is not limited to only geographic mapping of ownership but provide numerous alternative prospective that a person skilled in the art would readily recognized. In some embodiments, the instant invention supports predictive behavior modeling, such as, for example, calculating total shares held per CUSIP per ZIP+4 (Aggregation/Summarization).

In some embodiments, the instant invention allows to identify individual(s)/entities that may benefit from owning new financial assets based on their current and/or historical ownership of other financial assets. In some embodiments, the instant invention allows to design/tailor financial products/services based on knowledge of ownership of certain financial assets by individual(s)/entities in certain localities.

Figure 3:
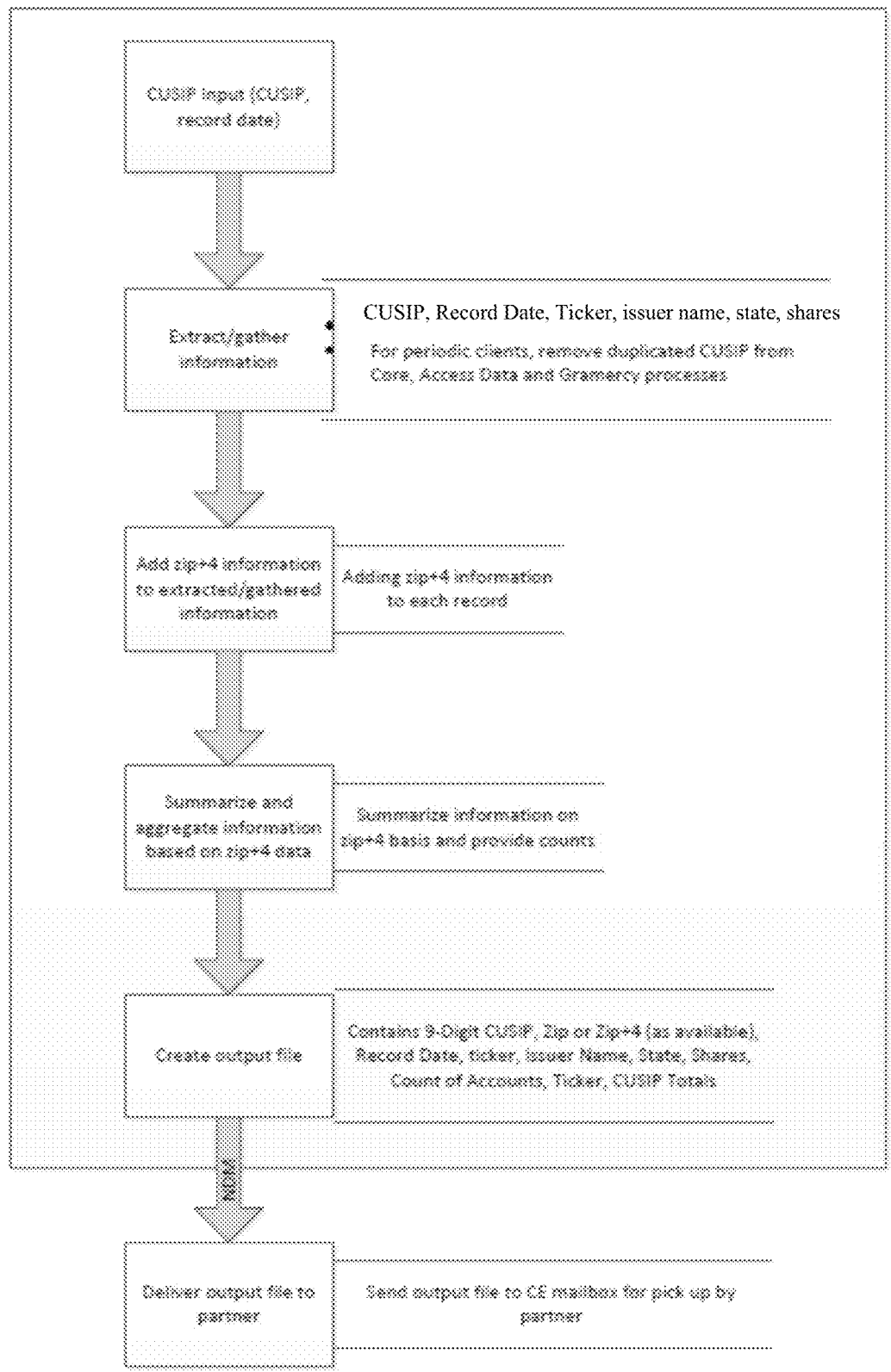
FIG. 3 illustrates a flowchart in accordance with some embodiments of the instant invention.

FIG. 3 shows a diagram of an exemplary process flow in accordance with some embodiments of the instant invention.

In some embodiments, each step identified in FIG. 3 is performed in a programmatic fashion leveraging a high speed compute platform.

Figure 4:
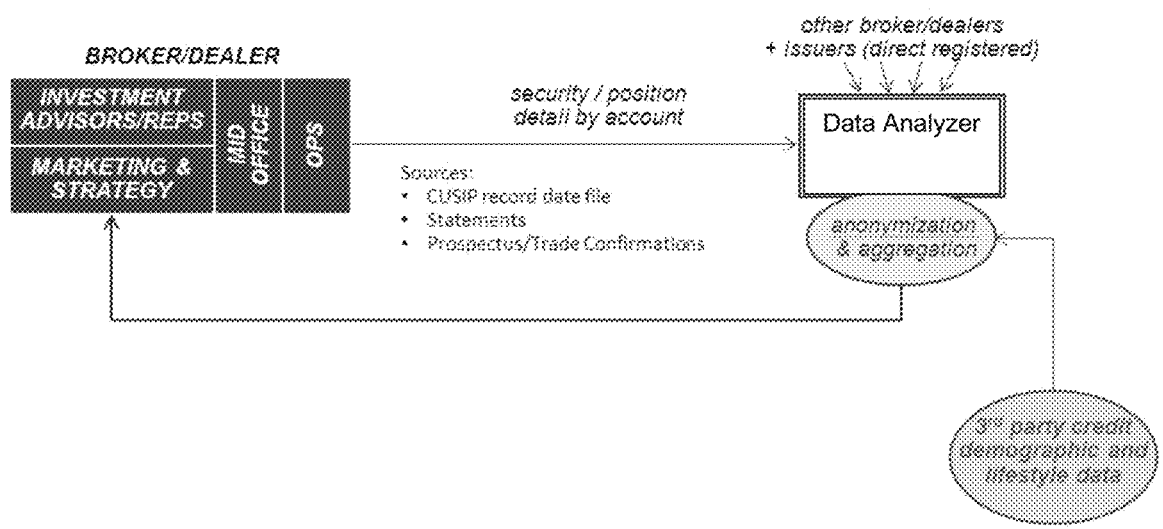
FIG. 4 illustrates another flowchart in accordance with some embodiments of the instant invention.

FIG. 4 shows a diagram of another exemplary process flow in accordance with some embodiments of the instant invention.

In some embodiments, as shown in FIGS. 3 and 4, the instant invention summarizes the data into an anonymous relevant format. In some embodiments, as shown in FIGS. 3 and 4, the instant invention summarizes the data into an anonymous and geographically relevant format.

In some embodiments, by enriching the data with valid zip code information, the instant invention can determine what financial instruments are associated with a particular geographic region in the United States and/or other jurisdictions (e.g., identifying a successful/unsuccessful sales effort in a particular region, tailoring product offering/mix based on preferences observed in certain geographic localities.

In some embodiments, the instant invention leverages financial data assigned unique identifier(s) based information (e.g., CUSIP (a number assigned in accordance with the Committee on Uniform Securities Identification Procedures), Central Index Key, International Securities Identification Number (ISIN), SEDOL, CINS, OCC Option Identifier, etc.) to provide a more accurate view of financial instrument purchases by American households and/or household of other jurisdictions.

In some embodiments, the instant invention automates the collection of financial and household data to improve timeliness and relevance in performing analyses that have increased probability of being correct. For example, as illustrated in FIG. 4, the inventive system of the present invention can also receive/obtain $3^{rd}$ party's credit demographics data. In some embodiments, the credit demographics data can include, but is not limited to:

Individual:
Date of Birth
Head of Household and Spouse Indicators
Marital Status
Ethnicity
Credit Card Type
Household:
Phone Number
Head of Household
Age
Profitability Score
Presence of Children
Length of Residence
Dwelling Unit Size
Owner/Rent Status
Home Value
Estimated Household Income
Mortgage Amount/Date
Purchase Power
WealthFinder
Potental Investors
Neighborhood:
Socio-economic indicators (e.g., education, gender, poverty, housing, healthcare (e.g., insurance, diseases prevalence, etc.), amenities, employment, etc.).

For example, as illustrated in FIG. 4, the inventive system of the present invention can also receive/obtain $3^{rd}$ party's lifestyle data (e.g., data such as similar to, but not limited to, data from Experian's ConsumerView database, etc.). In some embodiments, the lifestyle data can include, but is not limited to, data on:

Motoring (e.g., car driving patterns)
Holidays/Vacations
Use of technology
Use of Mobile 'phones
Financial arrangements and investments
Future plans (next six months).

In some embodiments, the cross-custodian nature of the data collection also enables the modeling of data in numerous ways by, for example, modeling not on a CUSIP level but also on the cross-custodian level (e.g., banks, brokerages, advisers, mutual funds, etc.).

In some embodiments, the inventive systems of the instant invention dynamically refresh and supplement, in real time or on periodic basis, its records to maintain the most updated view of household ownership of financial assets.

Illustrative Operating Environments for Some Embodiments

FIG. 1 illustrates a computer system in accordance with some embodiments of the present invention. However, not all of these components may be required to practice the invention, and variations in the arrangement and type of the components may be made without departing from the spirit or scope of the invention. In some embodiment, the inventive exchange system processes information for a large number of customers (e.g., at least 10,000; at least 100,000; at least 1,000,000, etc.) and concurrent transactions (e.g., at least 10,000; at least 100,000; at least 1,000,000, etc.). In other embodiments, the inventive exchange computer system is based on a scalable computer and network architecture that incorporates varies strategies for assessing the data, caching, searching, and database connection pooling. An example of the scalable architecture is an architecture that is capable of operating multiple servers. In some embodiments, the computing system in accordance with the instant invention may include, but not limiting to, one or more programmed computers, systems employing distributed networking, or other type of system that might be used to transmit and process electronic data.

In some embodiments, client devices (e.g., computers, mobile device, etc.) 102-104 of, for example, custodians of financial information (e.g., banks, brokerages, etc.) include virtually any computing device capable of receiving and sending a message over a network, such as network 105, to and from another computing device, such as servers (e.g., the inventive systems) 106 and 107, each other, and the like. In some embodiments, the set of such devices includes devices that typically connect using a wired communications medium such as personal computers, multiprocessor systems, microprocessor-based or programmable consumer electronics, network PCs, and the like. In some embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, In some embodiments, client devices 102-104 are any device that is capable of connecting using a wired or wireless communication medium such as a PDA, POCKET PC, wearable computer, and any other device that is equipped to communicate over a wired and/or wireless communication medium.

In some embodiments, client devices 102-104 are further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In some embodiments, network 105 is configured to couple one computing device to another computing device to enable them to communicate. In some embodiments, network 105 is enabled to employ any form of computer readable media for communicating information from one electronic device to another. Also, In some embodiments, network 105 includes a wireless interface, and/or a wired interface, such as the Internet, in addition to local area networks (LANs), wide area networks (WANs), direct connections, such as through a universal serial bus (USB) port, other forms of computer-readable media, or any combination thereof. In some embodiments, on an interconnected set of LANs, including those based on differing architectures and protocols, a router acts as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, In some embodiments, remote computers and other related electronic devices could be remotely connected to either LANs or WANs via a modem and temporary telephone link. In essence, In some embodiments, network 105 includes any communication method by which information may travel between client devices 102-104, and servers 106 and 107.

Figure 2:
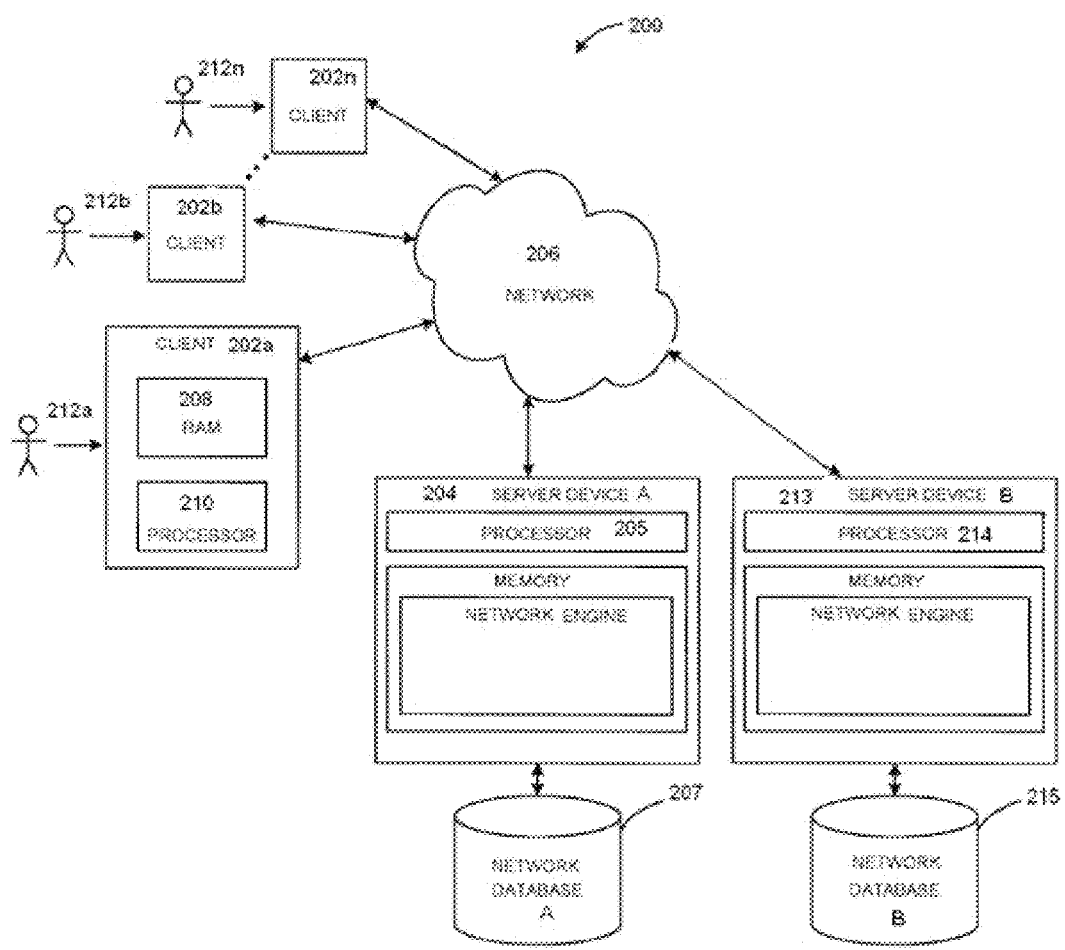

FIG. 2 shows another exemplary embodiment of the systems computer and network architecture that supports a computer systems system in accordance with some embodiments of the instant invention. The client devices of custodians of financial information (banks, brokerages, etc.) 202a, 202b thru 202n (e.g., computers, mobile device, smart routers, etc.) shown each comprises a computer-readable medium, such as a random access memory (RAM) 208 coupled to a processor 210. The processor 210 executes computer-executable program instructions stored in memory 208. Such processors comprise a microprocessor, an ASIC, and state machines. Such processors comprise, or are be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 210 of client 202a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media transmit or carry instructions to a computer, including a router, private or public network, or other transmission device or channel, both wired and wireless. The instructions comprise code from any computer-programming language, including, for example, C, C++, C#, Visual Basic, Java, Python, Perl, and JavaScript.

Client devices 202a-n also comprise a number of external or internal devices such as a mouse, a CD-ROM, DVD, a keyboard, a display, or other input or output devices. Examples of client devices 202a-n are personal computers, digital assistants, personal digital assistants, cellular phones, mobile phones, smart phones, pagers, digital tablets, laptop computers, Internet appliances, and other processor-based devices. In general, a client device 202a is any type of processor-based platform that is connected to a network 206 and that interacts with one or more application programs. Client devices 202a-n operate on any operating system capable of supporting a browser or browser-enabled application, such as Microsoft™, Windows™, or Linux. The client devices 202a-n shown include, for example, personal computers executing a browser application program such as Microsoft Corporation's Internet Explorer™, Apple Computer, Inc.'s Safari™, Mozilla Firefox, and Opera.

Through the client devices 202a-n, users/investors 212a-n can communicate over the network 206 with the inventive systems of the instant invention, each other and with other systems and devices coupled to the network 206. As shown in FIG. 2, server devices 204 and 213 (e.g., for the inventive systems) are also coupled to the network 206. In some embodiments, the server devices 204 and 213 may each include a processor 205 and 214, respectively, as well as respective memory and network engines. Server device A 204 may be in communication with a network database A 207 and, similarly, server device B 213 may be in communication with a network database B 215.

Figure 5:
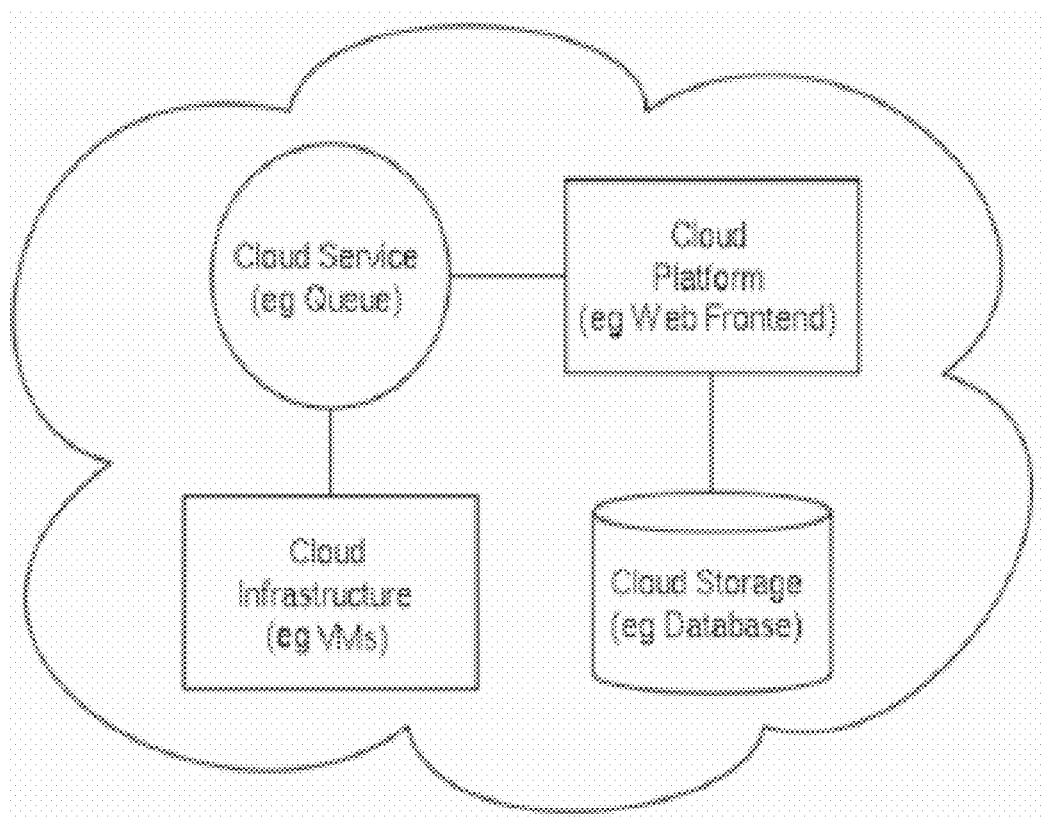
FIGS. 5-6 illustrate schematics of exemplary computer systems in accordance with some embodiments of the invention.
Figure 6:
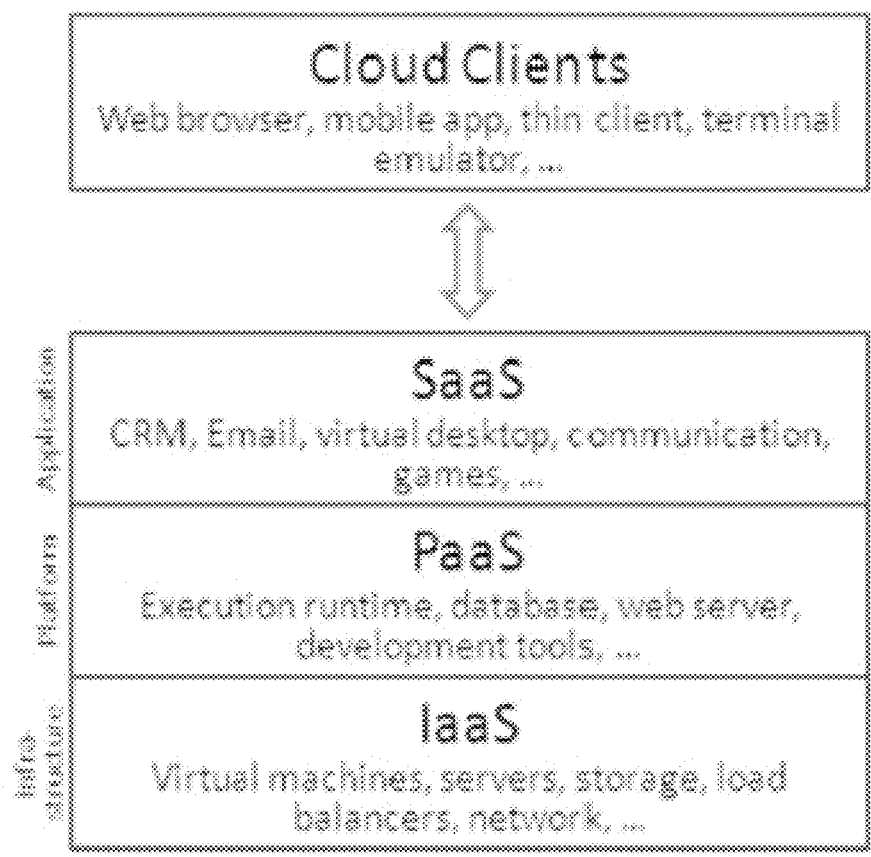

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/ manages the cloud computing/architecture as, but not limiting to: infrastructure a service (IaaS), platform as a service (PaaS), and software as a service (SaaS). FIGS. 5 and 6 illustrate schematics of exemplary implementations of the cloud computing/architecture.

Of note, the embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the instant invention provides a specifically programmed system that includes at least the following components: at least one programmed computer, having a non-transient computer tangible readable medium having stored thereon software instructions executable by at least one processor of the computer, where the software instructions at least include: code to periodically receive financial data from a plurality of financial-related entities related to a plurality of financial assets, where the receipt of the financial data during a particular time period results in an amount of the financial data that requires to split the financial data into a plurality of subparts to process the subparts of the financial data in parallel, hereby allowing to process the financial data received at the particular time period before a receipt of new financial data during a subsequent time period (e.g., where the subsequent time period is less than 0.1 second after the preceding time period, where the subsequent time period is less than 1 second after the preceding time period, where the subsequent time period is less than 1 minute after the preceding time period, where the subsequent time period is less than 1 hour after the preceding time period, where the subsequent time period is less than 24 hour after the preceding time period, etc.), where the financial data comprises a plurality of the following data: i) financial assets data, where the financial assets data comprises at least the following data for each financial asset: 1) a unique identifier that uniquely identifies such financial asset in a financial industry, 2) a record date of such financial asset, where the record date is a date on which owners of such financial asset to be identified, 3) an issuer name of such financial asset, and 4) a value or an amount of such financial asset that has been publicly distributed, ii) customer financial data, where the customer financial data comprises at least one of the following data: customer account data of a plurality of customers of the plurality of financial-related entities, customer prospectus data of the plurality of customers of the plurality of financial-related entities, and customer trade confirmation data of the plurality of customers of the plurality of financial-related entities, and iii) financial asset ownership data from issuers of the plurality of financial assets; code to consolidate the financial data from the plurality of financial-related entities into a consolidated financial data stored in at least one database file based on at least one standardized data format; code to analyze each record of the consolidated financial data with at least one address-matching program; based on the analysis with the at least one address-matching program, code to associate each record of the consolidated financial data with a respective eleven digit postal code to result in an address-enriched consolidated financial data; code to receive credit demographic data and lifestyle data for each for at least the plurality of customers of the plurality of financial-related entities; code to split the address-enriched consolidated financial data into a plurality of subparts, allowing the specifically programmed processing computer system to process the plurality of subparts of the address-enriched consolidated financial data in parallel; code to aggregate the credit demographic data and the lifestyle data with the address-enriched consolidated financial data for at least a portion of the plurality of customers of the plurality of financial-related entities; after the aggregation, code to anonymize the address-enriched consolidated financial data to form an anonymous address-enriched consolidated financial data; and code to link information of the anonymous address-enriched consolidated financial data across a plurality data relationship to form a consolidate household view of the anonymous address-enriched consolidated financial data for each respective eleven digit postal code.

In some embodiments, the code further includes at least: code to map ownership of each of the plurality of financial assets to at least one geographic location based on the consolidate household view of the anonymous address-enriched consolidated financial data for each respective eleven digit postal code.

In some embodiments, the code to consolidate the financial data from the plurality of financial-related entities into the consolidated financial data further includes at least code to remove duplicate information. In some embodiments, the unique identifier of an financial asset is CUSIP, and the code further includes at least code to calculate a total number of shares held per each respective eleven digit postal code. In some embodiments, the unique identifier of an financial asset is CUSIP, and the code further includes at least, for each financial-related entity, code to calculate a total number of shares held per each respective eleven digit postal code.

In some embodiments, the customer financial data comprises at least one of: i) a current customer financial data, and ii) a historical customer financial data. In some embodiments, at least a first portion of customers of the plurality of customers of the plurality of financial-related entities are individuals. In some embodiments, at least a second portion of customers of the plurality of customers of the plurality of financial-related entities are corporate entities.

In some embodiments, the instant invention provides a computer-implemented method that includes at least steps of: periodically receiving, by a specifically programmed processing computer system, financial data from a plurality of financial-related entities related to a plurality of financial assets, where the receiving the financial data during a particular time period results in an amount of the financial data that requires to split the financial data into a plurality of subparts to process the subparts of the financial data in parallel, hereby allowing to process the financial data received at the particular time period before a receipt of new financial data during a subsequent time period, where the financial data comprises a plurality of the following data: i) financial assets data, where the financial assets data comprises at least the following data for each financial asset: 1) a unique identifier that uniquely identifies such financial asset in a financial industry, 2) a record date of such financial asset, where the record date is a date on which owners of such financial asset to be identified, 3) an issuer name of such financial asset, and 4) a value or an amount of such financial asset that has been publicly distributed, ii) customer financial data, where the customer financial data comprises at least one of the following data: customer account data of a plurality of customers of the plurality of financial-related entities, customer prospectus data of the plurality of customers of the plurality of financial-related entities, and customer trade confirmation data of the plurality of customers of the plurality of financial-related entities, and iii) financial asset ownership data from issuers of the plurality of financial assets; consolidating, by the specifically programmed processing computer system, the financial data from the plurality of financial-related entities into a consolidated financial data stored in at least one database file based on at least one standardized data format; analyzing, by the specifically programmed processing computer system, each record of the consolidated financial data with at least one address-matching program; based on the analyzing with the at least one address-matching program, associating, by the specifically programmed processing computer system, each record of the consolidated financial data with a respective eleven digit postal code to result in an address-enriched consolidated financial data; receiving, by the specifically programmed processing computer system, credit demographic data and lifestyle data for each for at least the plurality of customers of the plurality of financial-related entities; splitting, by the specifically programmed processing computer system, the address-enriched consolidated financial data into a plurality of subparts, allowing the specifically programmed processing computer system to process the plurality of subparts of the address-enriched consolidated financial data in parallel; aggregating, by the specifically programmed processing computer system, the credit demographic data and the lifestyle data with the address-enriched consolidated financial data for at least a portion of the plurality of customers of the plurality of financial-related entities; after the aggregating, anonymizing, by the specifically programmed processing computer system, the address-enriched consolidated financial data to form an anonymous address-enriched consolidated financial data; and linking, by the specifically programmed processing computer system, information of the anonymous address-enriched consolidated financial data across a plurality data relationship to form a consolidate household view of the anonymous address-enriched consolidated financial data for each respective eleven digit postal code.

While a number of embodiments of the present invention have been described, it is understood that these embodiments are illustrative only, and not restrictive, and that many modifications may become apparent to those of ordinary skill in the art.

What is claimed is:

1. A computer system, comprising:
   at least one programmed computer, having a non-transient computer tangible readable medium having stored thereon software instructions executable by at least one processor of the computer, wherein the software instructions comprise:
   code to periodically receive financial data from a plurality of financial-related entities related to a plurality of financial assets from a plurality of source systems in a plurality of data formats,
   wherein the receipt of the financial data during a particular time period results in an amount of the financial data that requires to split the financial data into a plurality of subparts to process the subparts of the financial data in parallel, hereby allowing to process the financial data received at the particular time period before a receipt of new financial data during a subsequent time period,
   wherein the financial data comprises a plurality of the following data:
   i) financial assets data, wherein the financial assets data comprises at least the following data for each financial asset:
      1) a unique identifier that uniquely identifies such financial asset in a financial industry,
      2) a record date of such financial asset, wherein the record date is a date on which owners of such financial asset to be identified,
      3) an issuer name of such financial asset, and
      4) a value or an amount of such financial asset that has been publicly distributed,
   ii) customer financial data, wherein the customer financial data comprises at least one of the following data:
      1) customer account data of a plurality of customers of the plurality of financial-related entities,
      2) customer prospectus data of the plurality of customers of the plurality of financial-related entities, and
      3) customer trade confirmation data of the plurality of customers of the plurality of financial-related entities, and
   iii) financial asset ownership data from issuers of the plurality of financial assets;

code to consolidate the financial data from the plurality of financial-related entities into a consolidated financial data stored in at least one database file based on at least one standardized data format;
   code to analyze each record of the consolidated financial data with at least one address matching program;
   based on the analysis with the at least one address-matching program, code to associate each record of the consolidated financial data with a respective eleven digit postal code to result in an address-enriched consolidated financial data;
   code to receive credit demographic data and lifestyle data for each for at least the plurality of customers of the plurality of financial-related entities;
   code to split the address-enriched consolidated financial data into a plurality of subparts, allowing the specifically programmed processing computer system to process the plurality of subparts of the address-enriched consolidated financial data in parallel;
   code to aggregate the credit demographic data and the lifestyle data with the address-enriched consolidated financial data for at least a portion of the plurality of customers of the plurality of financial-related entities;
   after the aggregation, code to anonymize the address-enriched consolidated financial data using an anonymous relevant format to form an anonymous address-enriched consolidated financial data; and
   code to link information of the anonymous address-enriched consolidated financial data across a plurality data relationship to form a consolidated household view of the anonymous address-enriched consolidated financial data for each respective eleven digit postal code.

2. The system of claim 1, wherein the code further comprises:
   code to map ownership of each of the plurality of financial assets to at least one geographic location based on the consolidate household view of the anonymous address-enriched consolidated financial data for each respective eleven digit postal code.

3. The system of claim 1, wherein the code to consolidate the financial data from the plurality of financial-related entities into the consolidated financial data further comprises:
   code to remove duplicate information.

4. The system of claim 1,
   wherein the unique identifier of a financial asset is CUSIP, and
   wherein the code further comprises:
      code to calculate a total number of shares held per each respective eleven digit postal code.

5. The system of claim 1,
   wherein the unique identifier of a financial asset is CUSIP, and
   wherein the code further comprises:
      for each financial-related entity, code to calculate a total number of shares held per each respective eleven digit postal code.

6. The system of claim 1, the customer financial data comprises at least one of:
   i) a current customer financial data, and
   ii) a historical customer financial data.

7. The system of claim 1, wherein at least a first portion of customers of the plurality of customers of the plurality of financial-related entities are individuals.

8. The system of claim 1, wherein at least a second portion of customers of the plurality of customers of the plurality of financial-related entities are corporate entities.

9. A computer-implemented method, comprising:
periodically receiving, by a specifically programmed processing computer system, financial data from a plurality of financial-related entities related to a plurality of financial assets from a plurality of source systems in a plurality of data formats,
wherein the receiving the financial data during a particular time period results in an amount of the financial data that requires to split the financial data into a plurality of subparts to process the subparts of the financial data in parallel, hereby allowing to process the financial data received at the particular time period before a receipt of new financial data during a subsequent time period,
wherein the financial data comprises a plurality of the following data:
  i) financial assets data, wherein the financial assets data comprises at least the following data for each financial asset:
    1) a unique identifier that uniquely identifies such financial asset in a financial industry,
    2) a record date of such financial asset, wherein the record date is a date on which owners of such financial asset to be identified,
    3) an issuer name of such financial asset, and
    4) a value or an amount of such financial asset that has been publicly distributed,
  ii) customer financial data, wherein the customer financial data comprises at least one of the following data:
    1) customer account data of a plurality of customers of the plurality of financial-related entities,
    2) customer prospectus data of the plurality of customers of the plurality of financial-related entities, and
    3) customer trade confirmation data of the plurality of customers of the plurality of financial-related entities, and
  iii) financial asset ownership data from issuers of the plurality of financial assets;
consolidating, by the specifically programmed processing computer system, the financial data from the plurality of financial-related entities into a consolidated financial data stored in at least one database file based on at least one standardized data format;
analyzing, by the specifically programmed processing computer system, each record of the consolidated financial data with at least one address-matching program;
based on the analyzing with the at least one address-matching program, associating, by the specifically programmed processing computer system, each record of the consolidated financial data with a respective eleven digit postal code to result in an address-enriched consolidated financial data;
receiving, by the specifically programmed processing computer system, credit demographic data and lifestyle data for each for at least the plurality of customers of the plurality of financial related entities;
splitting, by the specifically programmed processing computer system, the address-enriched consolidated financial data into a plurality of subparts, allowing the specifically programmed processing computer system to process the plurality of subparts of the address-enriched consolidated financial data in parallel;
aggregating, by the specifically programmed processing computer system, the credit demographic data and the lifestyle data with the address-enriched consolidated financial data for at least a portion of the plurality of customers of the plurality of financial-related entities;
after the aggregating, anonymizing, by the specifically programmed processing computer system, the address-enriched consolidated financial data using an anonymous relevant format to form an anonymous address-enriched consolidated financial data; and
linking, by the specifically programmed processing computer system, information of the anonymous address-enriched consolidated financial data across a plurality data relationship to form a consolidated household view of the anonymous address-enriched consolidated financial data for each respective eleven digit postal code.

10. The method of claim 9, wherein the method further comprises:
mapping, by the specifically programmed processing computer system, ownership of each of the plurality of financial assets to at least one geographic location based on the consolidate household view of the anonymous address-enriched consolidated financial data for each respective eleven digit postal code.

11. The method of claim 9, wherein the consolidating the financial data from the plurality of financial-related entities into the consolidated financial data further comprises:
removing, by the specifically programmed processing computer system, duplicate information.

12. The method of claim 9,
wherein the unique identifier of a financial asset is CUSIP, and
wherein the method further comprises:
calculating, by the specifically programmed processing computer system, a total number of shares held per each respective eleven digit postal code.

13. The method of claim 9,
wherein the unique identifier of a financial asset is CUSIP, and
wherein the method further comprises:
for each financial-related entity, calculating, by the specifically programmed processing computer system, a total number of shares held per each respective eleven digit postal code.

14. The method of claim 9, the customer financial data comprises at least one of:
  i) a current customer financial data, and
  ii) a historical customer financial data.

15. The method of claim 9, wherein at least a first portion of customers of the plurality of customers of the plurality of financial-related entities are individuals.

16. The method of claim 9, wherein at least a second portion of customers of the plurality of customers of the plurality of financial-related entities are corporate entities.

* * * * *